United States Patent [19]

Demuth et al.

[11] 4,205,834
[45] Jun. 3, 1980

[54] DEVICE FOR FACILITATING THE ALIGNMENT OF HEAVY WORKPIECES AT A MACHINE TABLE OR THE LIKE

[75] Inventors: Walter Demuth, Wallisellen; Erhard Ruesch, Zürich, both of Switzerland

[73] Assignee: Maag Gear-Wheel & Machine Company Limited, Zürich, Switzerland

[21] Appl. No.: 4,552

[22] Filed: Jan. 17, 1979

[30] Foreign Application Priority Data

Feb. 3, 1978 [CH] Switzerland ..................... 01178/78

[51] Int. Cl.² .............................................. B23Q 3/18
[52] U.S. Cl. ...................................... 269/258; 269/296; 269/309; 409/11; 409/225
[58] Field of Search ........................ 269/258, 309–310, 269/296; 254/101, DIG. 4; 279/1 L; 51/216 R, 277, 227; 409/11, 1, 225

[56] References Cited

U.S. PATENT DOCUMENTS

| | | | |
|---|---|---|---|
| 3,175,820 | 3/1965 | Schiler | 269/309 |
| 3,714,740 | 2/1973 | Steinhardt | 51/227 R |
| 3,729,185 | 4/1973 | Roeske | 269/296 |

FOREIGN PATENT DOCUMENTS 2026565  12/1971  Fed. Rep. of Germany ........... 269/309

*Primary Examiner*—Robert C. Watson
*Attorney, Agent, or Firm*—Werner W. Kleeman

[57] ABSTRACT

A device for facilitating the alignment of heavy workpieces at a machine table or the like, comprising a housing capable of being arranged below the workpiece at the machine table. A pendulum support is arranged in the housing so as to have a limited tilting movement to all sides and equally can be moved between a rest position and support position where it supports the workpiece. The pendulum support is arranged so that it can be selectively raised and lowered. Further, there is provided a mechanically adjustable support which is guided so that it can be raised and lowered. The mechanically adjustable support is guided in the housing between a rest position and a support position where it supports the workpiece instead of the pendulum support.

12 Claims, 2 Drawing Figures

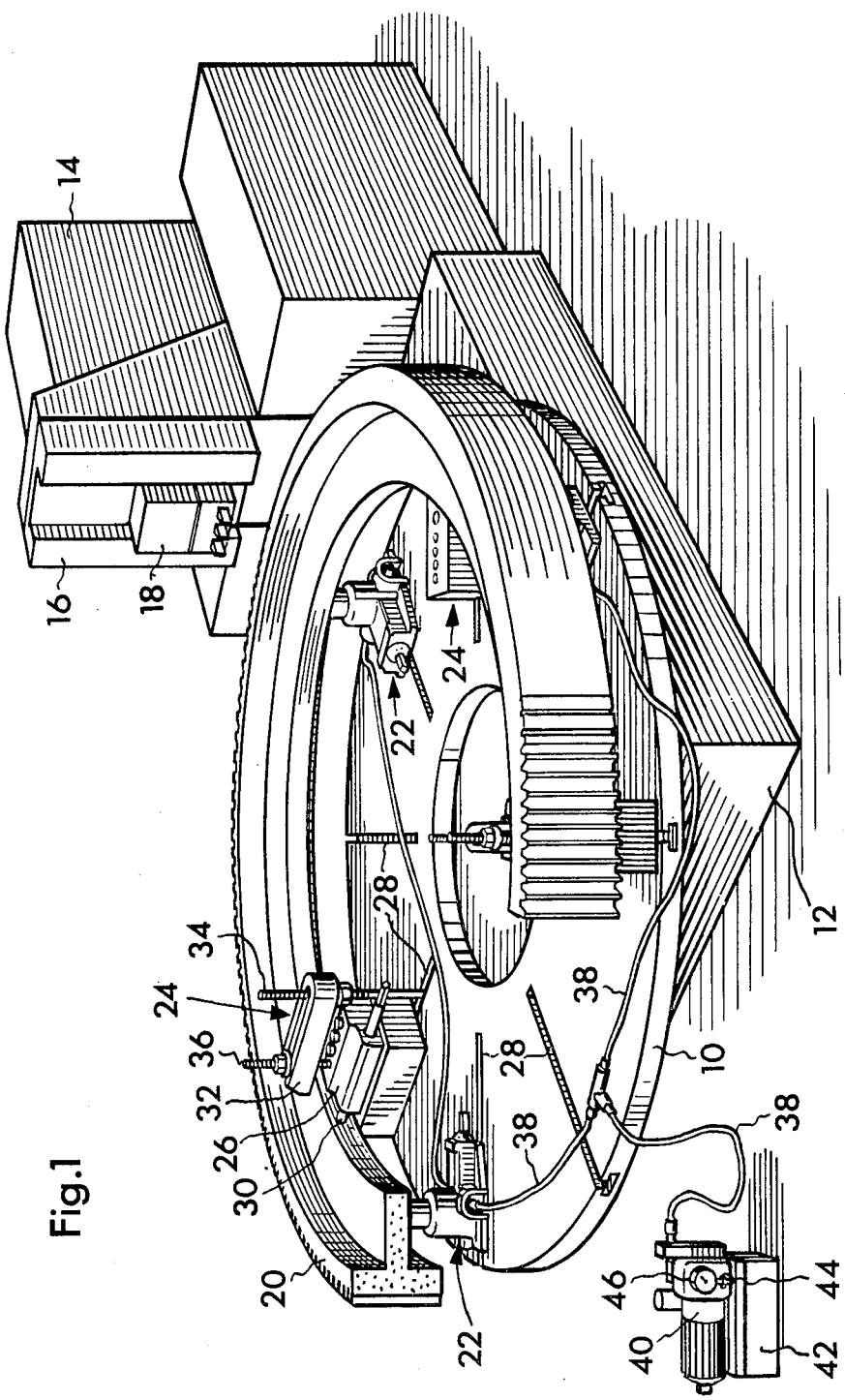

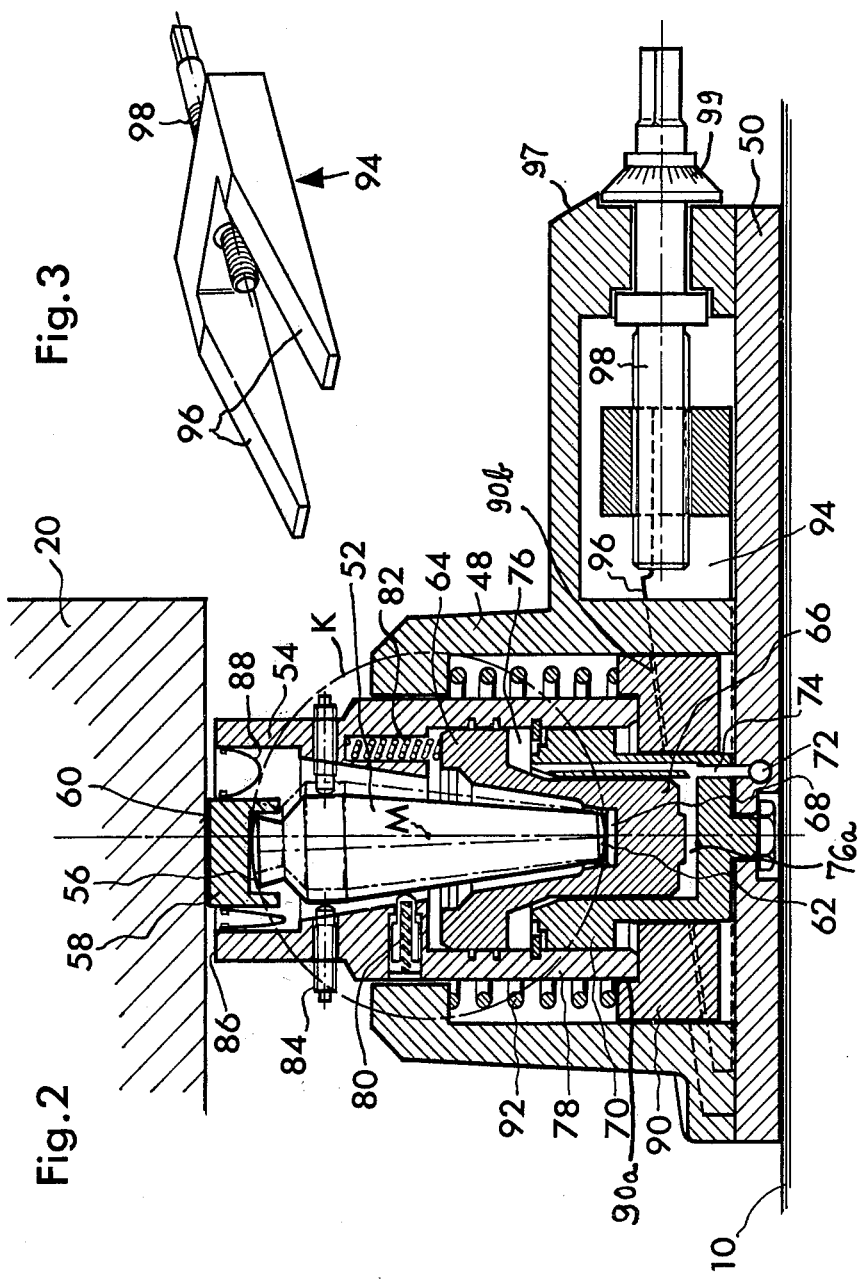

DEVICE FOR FACILITATING THE ALIGNMENT OF HEAVY WORKPIECES AT A MACHINE TABLE OR THE LIKE

BACKGROUND OF THE INVENTION

The present invention relates to a new and improved construction of device for facilitating the alignment or selective positioning of heavy workpieces at a machine table or the like.

Heavy workpieces, for the purpose of machining such at a machine tool, for instance hobbing, milling or grinding machines, are usually prepared in that they are directly deposited upon a machine table and chucked or fixedly clamped thereat. In many instances the exact machining or processing of the workpiece does not require any more than that the relevant tools are exactly aligned in relation to the fixedly clamped workpiece. However, there are situations where it is important that heavy workpieces are exactly aligned in relation to a certain point and/or a predetermined axis, for instance the rotational axis of the machine table of a gear working machine which operates according to the generating method. This alignment work is usually difficult and time-consuming, since the frictional forces between the heavy workpiece and the machine table or the like, are not only large, but owing to the known change-over between the static friction and the sliding friction, the so-called stick-slip-effect, are irregular. In addition thereto it should be appreciated that certain heavy workpieces, for instance large toothed rims, are not sufficiently inherently stable in order to withstand the displacement forces needed for overcoming the static friction, without deforming to such a degree that there is impaired the accuracy of the subsequent machining or processing work. It is conceivable to avoid this difficulty by providing ball or spherical guides between the machine table or the like and the workpiece, the spherical guides each comprising a lower plate and an upper plate supported thereon by means of balls or spheres. However, such ball guides, on the one hand, are sensitive to impacts which arise during the deposit or placement of the heavy workpieces, and, on the other hand, are not capable of being sufficiently loaded, in order to withstand the appreciable clamping or tensioning forces which are needed in many instances in order to positively fixedly retain the workpiece.

SUMMARY OF THE INVENTION

Therefore, with the foregoing in mind it is a primary object of the present invention to provide a new and improved construction of device for facilitating the alignment or selective positioning of heavy workpieces upon a machine table or the like, in a manner not associated with the aforementioned drawbacks and limitations of the prior art proposals discussed above.

Another and more specific object of the present invention aims at the provision of a new and improved construction of device for facilitating the alignment of heavy workpieces at a machine table or the like.

Yet a further significant object of the present invention aims at providing novel means which facilitate the alignment of a workpiece at a machine table or the like, such that the workpiece can be accurately aligned or positioned, as required, with a minimum of effort and without the need for the operator to carry out complicated movements.

Still a further significant object of the present invention aims at a novel construction of alignment device for workpieces at a predetermined portion of a machine, conveniently referred to herein broadly as the machine table, which alignment device is relatively simple in construction and design, economical to manufacture, relatively easy to use, highly reliable in its alignment operation, not readily subject to breakdown or malfunction, and requires a minimum of maintenance and servicing.

Now in order to implement these and still further objects of the invention, which will become more readily apparent as the description proceeds, the alignment device of the present development is manifested by the features that it comprises a housing which can be arranged below the workpiece at the machine table or the like. Further, there is arranged a pendulum support such that it can be raised and lowered, this pendulum support being tiltable within the housing to a limited extent to all sides and can also be shifted between a rest position and a support position where it supports the workpiece. A mechanically adjustable support is guided to be raisable and lowerable. The mechanically adjustable support is guided in the housing between a rest position and a support position where it supports the workpiece instead of the pendulum support.

Generally it is sufficient to provide three of the devices of the invention at as uniform as possible spacing from one another below a workpiece. However, it is possible to use a larger number of the inventive devices if the size and inherent elasticity of the workpiece requires supporting the workpiece at a larger number of support locations. In each case the device combines the advantages of a rigid support with the advantages of a support by means of roller bearings. In order to deposit a heavy workpiece the inventive devices are adjusted such that the pendulum support of each device assumes its rest position, and the mechanically adjustable support its support position. The mechanically adjustable support, guided only so that it can be raised and lowered, can be structured with very little expenditure such that it is itself capable of withstanding pronounced impacts and other loads without any damage. As soon as the workpiece bears upon the mechanically adjustable support, then the pendulum support is moved into its support position, where it at least partially relieves the mechanically adjustable support from the weight of the workpiece acting thereon. As soon as this has occurred, by means of the inventive devices which support the entire workpiece by means of the pendulum supports, it is possible to shift the workpiece in all horizontal directions while applying very little force. It is generally sufficient if the tilting range of the pendulum supports is dimensioned such that the workpiece can be shifted or displaced in each random horizontal direction through about 5 to 30 millimeters, preferably between 8 to 10 millimeters.

Before or during the horizontal displacement, or better still, subsequent thereto, it is also possible to correct the elevational position of the workpiece in that the pendulum support of one or more of the inventive devices is raised, and thereafter, the mechanically adjustable support is somewhat lowered or raised in accordance with the desired elevational correction. As soon as the workpiece has been aligned in the required manner, the pendulum supports are lowered into their rest position, without thereby altering the elevational position of the workpiece. In this way it is possible to align both radially as well as axially, in an accurate fashion and with very little work expenditure, for instance heavy gears or toothed rims in relation to the rotatable workpiece table of a gear machining or working machine.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic perspective view of a gear hobbing machine for machining a toothed rim or the like constituting an exemplary form of workpiece;

FIG. 2 is an enlarged vertical sectional view through part of the device shown in FIG. 1; and FIG. 3 illustrates a detail, in perspective view, of the arrangement of FIG. 2.

DETAILED DESCRIPTION OF THE PREFERRED EMBODIMENTS

Describing now the drawings, the exemplary illustrated machine tool of FIG. 1, constituted by a standard gear hobbing machine, will be seen to comprise a machine part in the form of a substantially circular machine table 10 or the like which is mounted upon a machine bed 12 so as to be rotatable about the vertical axis of the machine table 10. Further belonging to the hobbing machine is a machine stand or upright 14 equipped with a guide or guide means 16, which in the illustrated embodiment is vertically arranged. At the guide means 16 there can be moved up and down a hobbing carriage or slide 18.

A workpiece 20, in the illustrated embodiment in the form of for instance a toothed rim, is supported at the machine table 10. Specifically, the workpiece 20 is supported by means of three devices 22 which facilitate the alignment or desired positioning of such workpiece 20. These alignment devices 22, constituting subject matter of the invention, are arranged offset from one another through an angle of about 120°. As previously mentioned, a greater number of such devices 22 can be provided if the situation requires. Further, in the exemplary embodiment under discussion there are provided three centering and clamping or chucking devices 24 which are likewise arranged in offset relationship from one another through a respective angle of 120°.

These centering and clamping devices 24 are of conventional construction, and therefore, need not be discussed or illustrated beyond that which has been shown and the description to follow, particularly since details thereof are not crucial towards a proper understanding of the principles of the present invention. Each of these centering and clamping devices 24 possesses a block 26 which is fixedly clamped in a substantially T-shaped groove 28 of the machine table 10 and contains an essentially horizontal threaded spindle 30 which is radially arranged in relation to the machine table 10. Each threaded spindle 30 can be rotated with the aid of a suitable tool, such as a monkey wrench or the like applied at its radial inner end, in a manner such that its radial outer end, as illustrated, exerts a radial force at the workpiece 20, in order to center such workpiece and to retain it in a centered position. Further belonging to each centering and clamping device 24 is a clamping shoe 32 or equivalent structure which is arranged above the threaded spindle 30 and essentially parallel thereto, in other words, at least approximately radially in relation to the machine table 10. Each clamping shoe 32 bears with its radial inner end upon a support screw 34 anchored at the T-shaped groove 28, presses by means of its radial outer end upon the workpiece 20, and at the region of the radial outer end can be downwardly clamped by means of a clamping or tensioning screw 36 which likewise is anchored in the related T-shaped slot 28. Instead of using the centering and clamping devices 24 which are mechanically actuated in the described manner, it would be equally possible to employ likewise known hydraulic clamping devices.

The devices 22 for facilitating the alignment of the workpiece 20, in the illustrated embodiment, can be individually hydraulically actuated in accordance with their functions. Thus, as likewise best seen by referring to FIG. 1, these devices 22 are connected by means of pressure hoses or lines 38 at a pressurized fluid pump 40 which delivers to the devices 22 the pressurized fluid medium from a pressurized fluid container 42 at a pressure which can be adjusted at a valve 44 or equivalent structure and read-off a manometer 46.

Each of the devices 22 for facilitating the alignment work, as particularly well seen by referring especially to FIG. 2, comprises a housing 48 which is closed towards its lower end by a base plate 50 and contains a pendulum support 52 or equivalent structure which is arranged within a substantially tubular-shaped, mechanically adjustable support 54.

The pendulum support 52 has a substantially spherical segment-shaped upper end 56 upon which rests a head piece or element 58 having a flat or planar support surface 60 for the workpiece 20. The lower end 62 of the pendulum support 52 is likewise of spherical segment-like configuration. The surfaces of both ends 56 and 62 are part of a common spherical surface K, indicated by means of a broken line circle in FIG. 2, and the center point or curvature center M is located at the lengthwise axis of the pendulum support 52 structured as a rotatable component.

The pendulum support 52 is supported within a substantially pot-shaped support piston 64 whose base forms an externally cylindrical projection 66 of reduced diameter and contains a pressure plate 68 upon which there can roll the lower end 62 of the pendulum support 52. The pressure plate 68, both ends 56 and 62 of the pendulum support 52 and the head piece or element 58 are preferably formed of hardened steel.

The projection 66 of the support piston 64 is guided in a rigid piston 70 arranged coaxially with respect to the projection 66. The piston 70 is threadably connected in any suitable fashion, for instance by means of the illustrated threaded bolts or screws, shown in FIG. 2, with the base plate 50. The pressure hose 38 leading to the device 22 is connected by means of a channel 72 at the base plate 50 and a channel 74 at the rigid piston 70 with the two spaces or chambers 76 and 76a, shown in FIG. 2, between the fixed piston 70 and the support piston 64 on the one hand, and the projection 66 and the base of the fixed or rigid piston 70 on the other hand.

The lower half of the mechanically adjustable support 54 is formed by a cylinder 78 which is guided to be movable up and down upon the fixed piston 70 and, in turn, forms an additional guide or guide means for the support piston 64 which is movable up and down independently of the mechanically adjustable support 54. Above the cylinder 78 there are radially arranged in the mechanically adjustable support 54 or mutually offset through 90° with respect to one another the pressure or compression springs 80. These compression springs 80 always strive to retain the pendulum support 52 in a position where its axis coincides with that of the mechanically adjustable support 54. Furthermore, there are mounted at the upper part of the mechanically adjustable support 54 axially parallel compression springs 82 which strive to downwardly press the support piston 64.

Moreover, at the upper part of the mechanically adjustable support 54 there are radially threaded four adjustment screws 84 or equivalent structure which are angularly offset from one another through 90°. By means of these adjustment screws 84 it is possible to tilt or pivot the pendulum support 52 in all directions and to retain such in any randomly desired tilted position. Now in order to render possible the tilting movements of the pendulum support 52 needed for aligning the workpiece 20, with small spatial requirements and accordingly small structural height of the device 22, the pendulum support 52 tapers downwardly in a conical configuration from a cylindrical region which is associated with the adjustment screws 84 and the same is equally true essentially also for the internal spaces or compartments which are provided completely around the pendulum support 52 at the upper part of the mechanically adjustable support 54 and in the support piston 64.

The mechanically adjustable support 54 furthermore possesses a substantially ring-shaped, planar upper end surface 86, by means of which it can support the workpiece 20 independent of the head piece 58. The intermediate space between the end surface 86 and the support surface 60 is spanned or bridged by a diaphragm or membrane 88 which is attached at the inside of the mechanically adjustable support 54 and at the outside of the head piece 58. This diaphragm 88 protects the space extending about the pendulum support 52 against entry of contaminants or the like.

The lower end of the mechanically adjustable support 54 is inserted into a substantially ring-shaped centering bore or recess 90a of a wedge plate 90. This wedge plate 90 is displaceably vertically guided in the annular or ring-shaped space between the lower part of the fixed piston 70 and the housing 48 and is prebiased by a compression spring 92 downwardly against a bifurcated or fork-shaped wedge slide 94. This wedge slide 94 is displaceably guided in the housing 48 radially with respect to the common axis of the mechanically displaceable support 54, the support piston 64 and the fixed piston 70. Further, such wedge slide 94 is provided at its top side with a wedge surface 96 serving as a contact surface for a complementary wedge surface 90b of the wedge plate 90. In order to displace the wedge slide 94 there is provided within the housing 48 the rotatable, but axially non-displaceably mounted threaded spindle 98 which is threaded into the wedge slide 94.

Prior to the start of the alignment of the workpiece 20 the support piston 64 assumes a lower terminal position where its projection 66 directly bears upon the floor of the fixed piston 70. Consequently, the pendulum support 52 also assumes its lower end or terminal position which is below the end surface 86 of the mechanically adjustable support 54. The workpiece 20, after it has been deposited, usually with the aid of a crane, thus bears upon the end surface 86. Then the pressurized medium from the pressurized medium pump 40 is fed through the pressure hoses or lines 38 and the channels 72 and 74 into the spaces or chambers between the fixed piston 70 and the support piston 64 having the projection 66, so that the support piston 64 together with the pendulum support 52 and the head piece 58 are upwardly pressed. The pendulum support 52 assumes the position indicated in broken lines in FIG. 2, where, by means of the head piece 58, it raises the workpiece 20 from the end surface 86 of the mechanically adjustable support 54 to such an extent until it bears at the clamping shoes 32 of the centering and clamping devices 24. The same procedures are accomplished with the other two devices 22 arranged below the workpiece 20. The lifting stroke usually is limited to a few millimeters by the clamping shoes 32 which have previously been adjusted. As a general rule the threaded spindles 30 are applied at the workpiece 20 in such a fashion that there are not possible any unintentional movements of such workpiece in horizontal directions.

The workpiece 20 is now aligned with respect to the rotational axis of the machine table 10 in that it is horizontally shifted. This is accomplished either by rotating the threaded spindles 30 of the centering and clamping device 24 or, in the event there are employed centering devices without such threaded spindles, by rotating the adjustment screws 84 of the devices 22. In both cases the pendulum supports 52 carry out tilting movements in the desired direction. Thereafter, the workpiece 20, if necessary, is still elevationally aligned in that, depending upon requirements, at one or a number of the devices the mechanically adjustable support 54 is adjusted higher or lower by rotating the threaded spindle 98. By venting the pressurized fluid medium the elevational position is subsequently checked, and, if necessary, there can be initiated a further correction cycle by renewed infeed of the pressurized fluid medium and thus raising of the pendulum supports 52. As soon as the workpiece 20 has been completely aligned, then the mechanically adjustable supports 54 of all of the devices 22 are downwardly moved by appropriately rotating the related threaded spindles 98 until they carry the weight of the workpiece 20. Finally, the pendulum supports 52 of all of the devices 22 are downwardly moved and thus completely load relieved, while the tensioning screws 36 of all of the centering and clamping devices 24 are tightened.

By means of a scale or graduated ring 99 or equivalent structure and a suitable division or locating mark 97 operatively associated with the scale ring 99 and provided at the housing 48 it is possible to read-off the elevational adjustment of the mechanically adjustable support 54 which has been accomplished by means of the threaded spindle 98. There also can be directly evaluated as the elevational adjustment a correction magnitude determined by suitable measuring devices.

While there are shown and described present preferred embodiments of the invention, it is to be distinctly understood that the invention is not limited thereto, but may be otherwise variously embodied and practiced within the scope of the following claims.

Accordingly, what we claim is:

1. A device for facilitating the alignment of heavy workpieces at a machine table or the like, comprising:
 a housing arranged below the workpiece at the machine table;
 a pendulum support arranged in said housing;
 said pendulum support being tiltably movable to a limited extent to all sides within said housing and between a rest position and a support position where it supports a workpiece;

means for raising and lowering said pendulum support;

a mechanically adjustable support guided in said housing between a rest position and a support position where it supports the workpiece instead of the pendulum support; and means for raising and lowering said mechanically adjustable support.

2. The device as defined in claim 1, wherein:

the pendulum support has an upper end;

said upper end having a substantially spherical segment-like configuration;

a head piece carried by said upper end;

said head piece having a support surface for the workpiece.

3. The device as defined in claim 1, wherein:

said pendulum support has a lower end;

said lower end having a substantially spherical segment-like configuration;

a support piston against which bears said lower end of the pendulum support;

said support piston being movably guided for up and down movement within said housing;

said support piston having a lower face;

said means for raising and lowering said pendulum support comprising pressurized means for impinging against the lower face of said support piston.

4. The device as defined in claim 1, wherein:

said pendulum support has an upper end and a lower end and a lengthwise axis;

said upper end and lower end of said pendulum support possessing a common curvature center located at the lengthwise axis of the pendulum support.

5. The device as defined in claim 1, wherein:

said mechanically adjustable support possesses a substantially tubular-spaced configuration and surrounds said pendulum support;

spring means for operatively connecting said mechanically adjustable support with said pendulum support;

said spring means striving to retain said pendulum support in a position essentially coaxial with respect to said mechanically adjustable support.

6. The device as defined in claim 5, wherein:

said mechanically adjustable support has an upper region;

at least three radially arranged adjustment screws provided for the upper region of said mechanically adjustable support;

said adjustment screws initiating and limiting tilting movements of the pendulum support.

7. The device as defined in claim 5, wherein:

said pendulum support has a lower end;

said lower end having a substantially spherical segment-like configuration;

a support piston against which bears said lower end of the pendulum support;

said support piston being movably guided for up and down movement within said housing;

said support piston having a lower face;

said means for raising and lowering said pendulum support comprising pressurized means for impinging against the lower face of said support piston;

said mechanically adjustable support having a lower region;

said lower region of said mechanically adjustable support forming a cylinder in which there is guided the support piston.

8. The device as defined in claim 7, wherein:

said cylinder has a lower end;

a fixed piston for closing the lower end of the cylinder in relation to the housing;

said lower end of the cylinder being guided at said fixed piston.

9. The device as defined in claim 8, wherein:

said support piston possesses a substantially pot-shaped configuration;

said pendulum support having a lower portion received in said pot-shaped configured support piston;

said fixed piston having a substantially pot-shaped configuration; and the lower part of the support piston engaging into the pot-shaped configured fixed piston.

10. The device as defined in claim 1, wherein:

said means for raising and lowering the mechanically adjustable support comprises elevational adjustment means embodying wedge drive means.

11. The device as defined in claim 10, further including:

a base plate for supporting said housing; and said wedge drive means being supported upon said base plate.

12. A device for facilitating the alignment of heavy workpieces at a machine table or the like, comprising:

a housing arranged below the workpiece at the machine table;

a pendulum support arranged in said housing;

said pendulum support being tiltably movable to a limited extent to all sides within said housing and between a rest position and a support position where it supports a workpiece;

means for raising and lowering said pendulum support;

a mechanically adjustable support guided in said housing between a rest position and a support position where it supports the workpiece; and means for raising and lowering said mechanically adjustable support.

* * * * *